United States Patent Office 3,244,736
Patented Apr. 5, 1966

3,244,736
ORGANOMETALLIC COMPOUNDS
Thomas H. Coffield, Farmington, and Rex D. Closson, Northville, Mich., assignors to Ethyl Corporation, New York, N.Y., a corporation of Virginia
No Drawing. Filed May 16, 1962, Ser. No. 195,302
12 Claims. (Cl. 260—429)

This application is a continuation-in-part of our application Serial No. 690,905, filed October 18, 1957, and now abandoned.

This invention relates to novel organometallic compounds and to the method for their preparation. More particularly, the present invention relates to novel and useful organo compounds of manganese and other Group VIIB metals which are particularly useful as antiknocks in gasoline and other fuels.

It is accordingly an object of this invention to provide as a new composition of matter a novel class of organometallic compounds. A further object of this invention is to provide novel organo compounds of manganese and other Group VIIB metals of the Periodic Table. Still another object is to provide compounds of the above type which are non-ionic and have excellent solubility in hydrocarbon fuels. Still another object of this invention is to provide compounds which materially increase the antiknock quality of hydrocarbon fuels. Another object is to provide a convenient method for preparation of such compounds. Other objects and advantages of this invention will be more apparent from the following description and claims.

The above and other objects of this invention are accomplished by providing a compound having an aromatic molecule coordinated with a Group VIIB metal, the compound being stabilized by additional coordination with a cyclopentadienyl group, the aromatic molecule contributing six electrons and the cyclopentadienyl group contributing five electrons, thereby giving the metal the electron configuration of the next higher rare gas. More specifically, the compounds of the present invention have the general formula AMCy in which A is an aromatic molecule, M is the group VIIB metal including manganese, technetium and rhenium and Cy is a cyclopentadienyl group. The Group VIIB metals are in accordance with the Periodic Table given on page 392 of the "Handbook of Chemistry and Physics," 37th Edition (1955), Chemical Rubber Publishing Co., Cleveland, Ohio. In all of the compounds of this invention, the cyclopentadienyl group and the aromatic group donate electrons to the metal such that the metal assumes the highly stable electron configuration of the next higher inert gas of the Periodic Table.

The compounds of this invention are preferably aromatic cyclopentadienyl manganese compounds having an aromatic hydrocarbon molecule composed of 6 to 18 carbon atoms, said hydrocarbon being selected from the group consisting of benzene, biphenyl, naphthalene, hydrocarbon substituted benzenes, hydrocarbon substituted biphenyls and hydrocarbon substituted naphthalenes, said hydrocarbon being coordinated to a single Group VIIB metal atom, the compound being stabilized by additional coordination with a cyclopentadienyl radical selected from the class comprising the cyclopentadienyl radical and hydrocarbon substituted cyclopentadienyl radicals having from 6 to 13 carbon atoms which embody a ring having the general configuration found in cyclopentadiene, wherein the carbon atoms comprising a benzene ring within the aromatic hydrocarbon contribute six electrons to the metal atom, and the carbon atoms comprising a cyclopentadiene ring within the cyclopentadienyl radical contribute five electrons to the metal atom, thereby giving the metal the electron configuration of the next higher rare gas.

These compounds are prepared by a process comprising reacting (a) A cyclopentadienyl Group VIIB metal compound whose cyclopentadienyl radical is selected from the class consisting of the cyclopentadienyl radical and hydrocarbon substituted cyclopentadienyl radicals having from 6 to about 13 carbon atoms, which embody a ring of 5 carbon atoms having the general configuration found in cyclopentadiene and whose metal atom's electronic configuration has less electrons than the next higher rare gas of the Periodic Table, (b) An aromatic metal compound of a metal of Groups I to III of the Periodic Table whose aromatic constituent is bonded through a single carbon atom directly to the metal atom, said aromatic constituent containing 6 to 18 carbon atoms and being selected from the class consisting of benzene, biphenyl, naphthalene, hydrocarbon substituted benzenes, hydrocarbon substituted biphenyls, and hydrocarbon substituted naphthalenes, said reaction being conducted at a temperature between about −50° C. and 200° C., to form an intermediate reaction product, and thereafter reacting said intermediate reaction product with a compound having active hydrogen.

The compounds of this invention are quite different from any compound heretofore known. The aromatic portion of the compound is actually a molecule, as distinguished from an aryl radical, e.g., phenyl, which is found in many organometallic compounds of metals other than Group VIIB. The aromatic molecule is not bonded to the metal through a single carbon atom as in the usual aryl metal compounds, but instead, each carbon of the aromatic ring is bonded apparently by coordinate covalence in a fashion such that the ring contributes six electrons to the metal atom. Likewise, the cyclopentadienyl group also is bonded through the five carbon atoms and, in consequence, donates five electrons to the metal atom. Such donation of electrons contributes materially to the stability of the molecule since the metal atom, with six donated electrons, has the electron configuration of the next higher rare gas. Thus, with manganese compounds, for example, the manganese atom has the electron configuration of krypton. It is particularly significant that the metal atom in these compounds is coordinated by electrons from only hydrocarbon groups. For example, in the case of benzene cyclopentadienyl manganese, the cyclopentadienyl group donates five electrons and the benzene molecule donates six electrons, giving a stable compound which can be illustrated as follows:

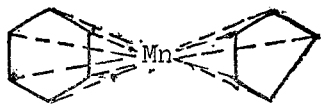

The structure of the above compounds has been proven by infrared analysis and other means. Upon decomposition, for example, benzene is produced. Contrariwise, when a phenyl compound is pyrolyzed the major product is diphenyl. Also, magnetic measurements show that the compounds of this invention are diamagnetic which is due to the fact that the six carbon atoms of the aromatic molecule are bonded to the metal.

The cyclopentadienyl group can be the cyclopentadienyl radical itself or can be a substituted cyclopentadienyl radical. More specifically, the cyclopentadienyl group can be a radical of the general type;

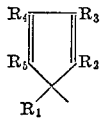

in which $R_1$ to $R_5$ can be the same or different and can be hydrogen or organo radicals, including alkyl, cycloalkyl, aryl or combinations of these radicals, such as alkaryl and aralkyl. Also, any radical is suitable which contains the five carbon ring similar to that found in cyclopentadiene, such as the indenyl radical. In general, cyclopentadienyl groups containing from 5 to about 13 carbon atoms are preferred.

The aromatic compounds coordinated to the metal in the compounds of this invention which are represented by A in the above formula are preferably compounds containing an isolated benzene nucleus, that is, aromatic compounds which are free of aliphatic unsaturation on a carbon atom adjacent the benzene ring and which do not contain unsaturation on a carbon atom of a fused ring which is adjacent the benzene nucleus. In other words, the preferred aromatic compounds applicable to the compounds of this invention have no aliphatic double bond in conjugated relationship to the ring. Thus, aryl and alkyl substituted aromatic compounds are preferred in this invention as are fused ring compounds having isolated benzene nuclei, that is, having no unsaturation on a carbon atom adjacent to a benzene ring. Aromatic compounds having from 6 to 18 carbon atoms are generally preferred in compounds of this invention. Benzene itself, mesitylene, toluene, biphenyl, tetralin, m-hexylbiphenyl and the like are examples of applicable aromatic compounds.

In some cases, other aromatic compounds which do not have an isolated nucleus are desirable. Typical examples of products produced from such compounds are styrene cyclopentadienyl manganese, methylstyrene methylcyclopentadienyl manganese, naphthalene cyclopentadienyl manganese and the like.

In general, the compounds of this invention preferably contain from 6 to 18 carbon atoms in the aromatic molecule.

Typical specific examples of compounds of this invention are benzene cyclopentadienyl manganese; benzene methylcyclopentadienyl manganese; benzene dimethylcyclopentadienyl manganese; and other benzene cyclopentadienyl derivatives including dimethylcyclopentadienyl; ethylcyclopentadienyl; isopropylcyclopentadienyl; benzylcyclopentadienyl; n-octylcyclopentadienyl; phenylcyclopentadienyl; p-biphenylcyclopentadienyl; α-naphthylcyclopentadienyl manganese benzene, and the like.

Typical examples of compounds containing other aromatic groups are toluene cyclopentadienyl manganese; p-xylene methylcyclopentadienyl manganese; o-xylene cyclopentadienyl manganese; mesitylene methylcyclopentadienyl manganese; ethylbenzene methylcyclopentadienyl manganese; tetralin methylcyclopentadienyl manganese; toluene indenyl manganese; xylene 2-methylindenyl manganese; toluene cyclohexylindenyl manganese; mesitylene diphenylindenyl manganese, and the like. Other typical examples of suitable aromatic portions of the molecule are o-diethylbenzene and 1,2,4-trimethylbenzene.

Typical examples of compounds of this invention containing rhenium are benzene cyclopentadienyl rhenium; benzene methylcyclopentadienyl rhenium; mesitylene methylcyclopentadienyl rhenium; o-diethylbenzene o-tolyl cyclopentadienyl rhenium; biphenyl 2,3,4-triethylphenyl cyclopentadienyl rhenium; tetralin indenyl rhenium and alkylated tetralins; ethylbenzene sec-butyl indenyl rhenium; and the like. Typical examples of compounds containing technetium in accordance with this invention are benzene cyclopentadienyl technetium; mesitylene methylcyclopentadienyl technetium; toluene 3-cyclohexylindenyl technetium; tetralin diphenylindenyl technetium, and the like.

The compounds of the invention are prepared by a process which comprises reacting a cyclopentadienyl Group VIIB metal compound with an aromatic compound of a dissimilar metal under reducing conditions to form an intermediate. This reaction product is decomposed to form the aromatic cyclopentadienyl Group VIIB metal compound. This decomposition of the complex is normally accomplished by reaction with a compound having an active hydrogen, e.g., hydrolysis or alcoholysis. The process is preferably conducted in an inert solvent, particularly ethers and acetals.

An example of this process comprises the reaction of dicyclopentadienyl manganese with a phenyl Grignard reagent employing an excess of the Grignard as a reducing agent. The intermediate which results in this reaction is then hydrolyzed under mildly acid conditions to produce an aromatic cyclopentadienyl manganese compound.

In the feed cyclopentadienyl Group VIIB metal compound, the metal atom does not have an electron configuration corresponding to the configuration of the next higher rare gas. In contrast, as pointed out above, the metal atom in the product, i.e., the aromatic cyclopentadienyl manganese compound, does have the electron configuration corresponding to the next higher gas.

The dissimilar metal of the aromatic metal compound is preferably a metal of Groups I–III of the Periodic Table and has the aromatic constituent bonded through a single carbon atom directly to the metal atom. The aromatic metal compound can have one or more aromatic constituents as in the case of sodium phenyl, calcium diphenyl and aluminum triphenyl. Moreover, the polyvalent metals can have other groups in the molecule, including inorganic or organic anions. Typical examples of suitable aromatic metal compounds for reaction with the cyclopentadienyl Group VIIB metal compounds are phenyl sodium, ethylphenyl lithium, di-n-hexyl phenyl potassium, dixylyl calcium, diphenyl magnesium, phenyl magnesium bromide, phenyl magnesium chloride, 6-tetrahydronaphthyl magnesium iodide, diphenyl zinc, biphenyl zinc bromide, triphenyl aluminum, phenyl aluminum dichloride, phenyl aluminum dibromide, diphenyl aluminum chloride, diphenyl aluminum iodide, triphenyl gallium, triphenyl boron, triphenyl indium, diphenyl indium bromide, and the like.

The cyclopentadienyl Group VIIB metal compound can be a bis(cyclopentadienyl) metal compound or a cyclopentadienyl metal compound having inorganic or organic radicals. Typical examples of suitable cyclopentadienyl Group VIIB metal compounds useful in the processes of this invention are bis(cyclopentadienyl) manganese, bis-(methylcyclopentadienyl) manganese, bis(ethylcyclopentadienyl) manganese, bis(phenylcyclopentadienyl) manganese, bis(indenyl) manganese, cyclopentadienyl manganese chloride, methylcyclopentadienyl manganese chloride and bromide, n-octyl cyclopentadienyl manganese iodide, di(cyclopentadienyl) manganese sulfate, methylcyclopentadienyl manganese acetate, tri(cyclopentadienyl) manganese phosphate and the like.

The reducing conditions of the process can be provided by the use of an excess of the aromatic compound used to complex the Group VIIB metal compound.

The temperature of the process of this invention is not critical but usually is from about −50 to 200° C. and preferably between about 50–150° C. With manufacture of most compounds of this invention, the reaction rate below 0° C. is unduly slow for commercial operation. The reaction rates above 200° C. are usually avoided due to the normal problems involved in high-temperature operations and due to the tendency of some of the reactants to decompose at elevated temperatures.

The process of this invention is generally conducted at about atmospheric pressure, although in some cases subatmospheric or elevated pressures are desirable. Frequently, it is desired to employ the autogenous pressure of the system.

The ether solvents suitable in the present invention can be either mono- or polyethers. Typical examples of suitable ethers are dimethyl ether, methylethyl ether, methylisopropyl ether, methyl-n-propyl ether, or mixtures of these ethers. The preferred polyethers are ethyleneglycol diethers such as methyl methyl, methylethyl, ethyl ethyl, methylbutyl, butyl butyl, butyl lauryl; diethyleneglycol ethers, such as methyl methyl, ethyl ethyl, ethyl butyl and butyl lauryl; trimethylene glycol ethers, such as dimethyl, diethyl, methyl ethyl, etc.; glycerol ethers such as trimethyl, dimethyl ethyl, diethylmethyl, etc.; and cyclic ethers such as dioxane, tetrahydrofuran, methyl glycerol formal, dimethylene pentaerythite, and the like.

A wide variety of acetals can also be used as solvents in the present invention. Typical examples of suitable acetals are methylal; 1,1-dimethoxy ethane; 1,1-dimethoxy propane, 1,1-dimethoxy butane; glycol formal, methyl glycerol formal, etc. The preferred acetals are methylal, glycol formal and methyl glycerol formal.

The quantity of solvent employed in the process is not critical. Normally, a sufficient quantity is used to assure solution of the reactants. A large excess of solvent can be used, the upper limit usually being determined by economics. Generally, 0.1 to 100 moles of solvent are used per mole of reactants, although from 2 to 10 moles of solvent is preferred.

To further illustrate the novel compounds and the process by which they are prepared, the following examples are presented. All parts and percentages are by weight unless otherwise indicated.

*Example I*

Eleven and two-tenth parts of bis(methylcyclopentadienyl) manganese dissolved in 40 parts of tetrahydrofuran were added to 5.2 parts of manganous chloride in a vessel provided with stirring means and refluxing means. An atmosphere of nitrogen was maintained in the vessel. The mixture was brought to reflux for 15 minutes and then cooled to room temperature. The resulting methylcyclopentadienyl manganese chloride was not isolated. To this was added 36 parts of phenyl magnesium bromide dissolved in 150 parts of tetrahydrofuran. This mixture was stirred with reflux overnight. The mixture was then hydrolyzed with excess five percent hydrochloric acid. The resulting organic layer was separated from the water layer and evaporated at reduced pressure. Twenty-five parts of benzene were added to the residues and evaporation again effected to remove water. The residues were then dissolved in 20 parts of petroleum ether, boiling point 35–45° C., and placed on a chromatograph column containing alumina. The material was eluted from the column with low-boiling petroleum ether and the product collected was a red solution. The solution was evaporated to give a pink solid, which on sublimation at reduced pressure gave mixed crystals, white and red in color. The red and white crystals were then separated. The white crystals were biphenyl and the red crystals were benzene methylcyclopentadienyl manganese. These were purified further by subliming two more times. The elemental analysis for the red crystals was 67.9 percent carbon, 6.23 percent hydrogen, and 25.9 percent manganese. This corresponds very closely to the calculated analysis for benzene methylcyclopentadienyl manganese. The infrared spectrum completely supported the structure. Thermal decomposition of the benzene methylcyclopentadienyl manganese gave benzene in a 48 percent of theoretical yield. The melting point of the compound was 116–118° C.

The benzene methylcyclopentadienyl product has outstanding antiknock properties when used in gasoline in internal combustion engines. When benzene methylcyclopentadienyl manganese is added to a gallon of gasoline in amount such that two grams of manganese are present, the antiknock rating in an internal combustion engine of the gasoline is improved materially, i.e., more than five octane numbers.

The bis(methylcyclopentadienyl) manganese was prepared in tetrahydrofuran solvent at reflux temperature by reacting sodium and methylcylopentadiene monomer. The sodium methylcyclopentadienyl reaction product was then reacted with manganous chloride at reflux temperature of the tetrahydrofuran to give bis(methylcyclopentadienyl) manganese and sodium chloride. The solvent was vaporized under reduced pressure and the residue distilled to give pure bis(methylcyclopentadienyl) manganese as a brown solid which was stored out of contact with oxygen until used.

The phenyl magnesium bromide was prepared in tetrahydrofuran by allowing magnesium metal to react with bromobenzene at reflux temperature of the solvent.

*Example II*

Example I is repeated except that cyclopentadienyl manganese bromide is reacted with phenyl magnesium bromide in 200 parts of ethyleneglycol dimethylether. The temperature of the reaction is maintained at about 150° C. Benzene cyclopentadienyl manganese is recovered in good yield.

*Example III*

Benzene indenyl manganese is prepared according to the procedure of Example I in ethyleneglycol diethylether, using a reaction temperature of 100° C. In this case, bis(indenyl) manganese is employed instead of the chloride compound and triphenyl aluminum is used in place of the phenyl Grignard.

*Example IV*

The procedure of Example I is repeated except that indenyl manganese chloride is reacted with diphenyl calcium in an equal molar ratio. Diethylether is employed as the solvent and the reaction mass is refluxed for 20 hours. In this run, inverse addition is used, i.e., the indenyl manganese chloride is added slowly to the diphenyl calcium. The product is worked up in accordance with the previous examples and a good yield of benzene indenyl manganese is obtained.

*Example V*

Example I was repeated except that greenish mesityl magnesium bromide was employed instead of the phenyl derivative and the product was the orange, crystalline solid, mesitylene methylcyclopentadienyl manganese.

*Example VI*

The procedure of Example I was followed except that 11.8 parts of bis(methylcyclopentadienyl) manganese were reacted directly with 24 parts of phenyl magnesium bromide. The product recovery procedure was the same. A higher yield of product, benzene methylcyclopentadienyl manganese, resulted.

*Example VII*

The procedure outlined in Example I was followed except that seven parts of methylcyclopentadienyl manganese chloride were added to 30 parts of phenyl magnesium bromide. This modification maintained a high concentration of phenyl magnesium bromide in the presence of the bis(methylcyclopentadienyl) manganese chloride at all times. The product work up was the same and benzene methylcyclopentadienyl manganese was obtained.

*Example VIII*

Example I is repeated except that bis(methylcyclopentadienyl) manganese is reacted with 6-tetrahydronaphthyl magnesium bromide in ethyleneglycol methylethyl ether solvent at reflux temperature of the mixture. The tetralin methylcyclopentadienyl manganese product is recovered in good yield and purified as in Example I.

Example IX

Example I is repeated except that bis(methylcyclopentadienyl) technetium is reacted with n-octyl phenyl magnesium bromide to form n-octyl benzene methylcyclopentadienyl technetium. The bis(methylcyclopentadienyl) technetium is prepared similarly to the manganese compound, using technetium chloride.

Example X

Toluene methylcyclopentadienyl rhenium is prepared by the procedure of Example I except that tolyl magnesium bromide is reacted with bis(methylcyclopentadienyl) rhenium in diethylether solvent. The product is obtained in excellent yield. The bis(methylcyclopentadienyl) rhenium is prepared by reacting methylcyclopentadienyl sodium with rhenium trichloride.

The novel compounds of this invention can be employed with hydrocarbon fuels of the gasoline boiling range and lubricating oils for improving operation characteristics of spark ignition internal combustion engines. The compounds can be used in the fuels and lubricating oils by themselves or together with other additive components, such as scavengers, deposit modifying agents containing phosphorus and/or boron, and also other antiknock agents such as tetraethyllead, etc.

To illustrate the antiknock effect of the benzene cyclopentadienyl Group VIIB metal compounds of this invention, tests were conducted by the Research Method of determining octane number. The Research Method of determining the octane number of a fuel is generally accepted as a method of test which gives a good indication of fuel behavior in full-scale automotive engines under normal driving conditions and the method most used by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D–908–55 contained in the 1956 Edition of "ASTM Manual of Engine Test Methods for Rating Fuels." The tests were conducted in a fuel having an octane number of 88.8. When 1.16 grams of manganese per gallon as benzene methylcyclopentadienyl manganese, a compound of this invention, were added to the fuel, an octane number of 92.8 resulted.

The compounds can be added directly to the hydrocarbon fuels or lubricating oils and the mixture subjected to stirring, mixing, or other means of agitation until a homogeneous fluid results. Alternatively, the compounds of this invention may be first made up into concentrated fluids containing solvents such as kerosene, toluene, hexane, and the like, as well as other additives such as scavengers, antioxidants and other antiknock agents, e.g., tetraethyllead. Still other components that can be present are discussed more fully hereinbelow. The concentrated fluids can then be added to the fuels.

As the organolead antiknock agent which is an ingredient of certain of the compositions of this invention, organolead compounds in general may be used. Preferable, however, are hydrocarbon lead compounds, such as tetraphenyllead, tetratolyllead, and particularly tetraalkyllead compounds such as tetramethyllead, tetrapropyllead and the like. In general, the amount of organolead antiknock agent is selected so that its content in the finished gasoline is equivalent to at least about one gram of lead per gallon.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide, as, for example, lead dihalide and manganese dihalide. In other words, a theory of halogen represents two atoms of halogen for every atom of lead and/or manganese present. In like manner, a theory of phosphorus is the amount of phosphorus required to convert the lead present to lead orthophosphate, $Pb_3(PO_4)_2$, that is, a theory of phosphorus based on lead represents an atom ratio of two atoms of phosphorus to three atoms of lead. When based on manganese, a theory of phosphorus likewise represents two atoms of phosphorus for every three atoms of manganese, that is, sufficient phosphorus to convert manganese to manganese orthophosphate, $Mn_3(PO_4)_2$.

When employing the compounds of this invention together with scavengers, an antiknock fluid for addition to hydrocarbon fuels is prepared comprising aromatic cyclopentadienyl manganese compounds together with various halogen-containing organic compounds having from 2 to about 20 carbon atoms in such relative proportions that the atom ratio of manganese-to-halogen is from about 50:1 to about 1:12. The scavenger compounds can be halohydrocarbons both aliphatic and aromatic in nature, or a combination of the two, with halogens being attached to carbons either in the aliphatic or the aromatic portions of the molecule. The scavenger compounds may also be carbon, hydrogen, and oxygen-containing compounds such as haloalkyl ethers, halohydrins, halo esters, halonitro compounds, and the like. Still other examples of scavengers that may be used in conjunction with our manganese compounds either with or without hydrocarbolead compounds are illustrated in U.S. Patents 2,398,281 and 2,479,900–903, and the like. Mixtures of different scavengers may also be used. These fluids can contain other components as stated hereinabove. In like manner, manganese-containing fluids are prepared containing from 0.01 to 1.5 theories of phosphorus in the form of phosphorus compounds. To make up the finished fuels, the concentrated fluids are added to the hydrocarbon fuel in the desired amounts and the homogeneous fluid obtained by mixing, agitation, etc.

The ratio of the weight of manganese to lead in fluids and fuels containing the two components can vary from about 1:880 to about 50:1. When no lead is present, the latter figure becomes 1:0. A preferred range of ratios, however, when both the manganese compounds of this invention and hydrocarbolead compounds are employed, is from about 1:63.4 to about 30:1. For example, the addition of 0.05 gram of manganese per gallon in the form of benzene methylcyclopentadienyl manganese to a commercial fuel having an initial boiling point of 90° F. and a final boiling point of 406° F. and containing 3.17 grams of lead per gallon in the form of tetraethyllead improves the antiknock qualities of the fuel. The ratio of manganese to lead on a weight basis is 1:63.4 in this case. In like manner, the addition of six grams of manganese per gallon to the same fuel containing 0.2 gram of lead per gallon in the form of tetraethyllead results in a considerable improvement in the antiknock quality of the fuel. The manganese-to-lead ratio in this case is 30:1.

The following examples are illustrative of fluids and fuels containing our new compounds.

Example XI

To 1000 gallons of a commercial fuel having an initial boiling point of 90° F. and a final boiling point of 406° F. is added 59.4 grams of methylcyclopentadienyl manganese benzene, $C_6H_7Mn(CO)_3$, and the mixture subjected to agitation until the additive is distributed evenly throughout the fuel, in an amount equivalent to 0.013 gram of manganese per gallon of fuel.

Fuels containing mixtures of two or more aromatic cyclopentadienyl manganese compounds, such as mixtures of benzene cyclopentadienyl manganese and benzene methylcyclopentadienyl manganese, are prepared in a manner similar to that employed in this example.

Example XII

In a manner similar to that employed in Example XI, benzene indenyl manganese is blended with a commercial fuel having an initial boiling point of 94° F. and a final boiling point of 390° F. in an amount equivalent to 10 grams of manganese per gallon.

Fuels containing six grams of manganese in the form of benzene methylcyclopentadienyl manganese are prepared in a manner similar to that of Example XI.

Example XIII

To 11 parts of benzene methylcyclopentadienyl manganese is added five parts of ethylene dichloride and the mixture agitated until a homogeneous fluid results.

In like manner, a fluid is prepared comprising mesitylene indenyl manganese and ethylene dibromide in which the manganese to bromine ratio is 1:6, representing three theories of bromine based on the manganese. Likewise, a fluid containing mesitylene ethylcyclopentadienyl manganese, ethylene bromohydrin, and 2,3-dichloro-1,4-dimethylbenzene is prepared in such proportions that for every 75 atoms of manganese, there are one atom of bromine and two atoms of chlorine, representing the total of 0.02 theory of halogen.

The above fluids are added to hydrocarbon fuels in amounts so as to provide improved fuels containing 0.015 gram, 0.03 gram, 6 grams and 10 grams of manganese per gallon.

Example XIV

To 13.2 parts of lead in the form of tetrathyllead in an antiknock fluid containing 0.5 theory of bromine as ethylene dibromide and 1.0 theory of chlorine as ethylene dichloride, wherein the theories of halogen are based upon the amout of lead present, is added 0.015 part of manganese in the form of benzene ethyl indenyl manganese. This fluid is then added to a commercial hydrocarbon fuel having an initial boiling point of 82° F. and a final boiling point of 420° F. in an amount so as to provide 13.2 grams of lead and 0.015 gram of manganese per gallon.

Example XV

A concentrated fluid is prepared as in Example XIV containing kerosene, a blue dye, and 10 parts by weight of manganese as benzene octylcyclopentadienyl manganese for every 0.02 part of lead in the form of diethyldimethyllead. This fluid is then blended with a commercial hydrocarbon fuel having an initial boiling point of 90° F. and a final boiling point of 394° F. in an amount sufficient to provide ten grams of manganese and 0.02 gram of lead per gallon.

Example XVI

A fluid is prepared containing 25 parts by weight of manganese as xylene tributylcyclopentadienyl manganese and 158 parts of lead as tetraethyllead together with 0.1 theory of bromine as 2,3-dibromo-2,3-dimethylbutane, 0.5 theory of bromine as ethylene dibromide, and 1.0 theory of chlorine as ethylene dichloride. The theories of halogen are based on the total amount of lead and manganese metal present. This fluid is then added to a commercial hydrocarbon fuel having an initial boiling point of 112° F. and a final boiling point of 318° F. In an amount such as to provide 0.25 gram of manganese and 1.58 grams of lead per gallon.

Example XVII

To a fuel containing 0.02 gram of lead per gallon as diphenyldiethyllead, 1.0 theory of bromine as ethylene dibromide, and 0.2 theory of phosphorus in the form of tricresylphosphate, is added benzene phenylcyclopentadienyl manganese in an amount equivalent to 0.03 gram of manganese per gallon. This small amount of manganese in the form of the compounds of this invention provides a considerable increase in the antiknock quality of the fuel as shown upon testing in a single-cylinder engine.

Other fuels and fluids are prepared in the same manner as illustrated hereinabove which contain other deposit-modifying agents such as boric acid, borate esters, boronic esters, etc. Likewise, lubricating oils containing from 0.1 to about 5 weight percent manganese in the form of the aromatic cyclopentadienyl manganese compounds of this invention are prepared, and these lubricating oils, when used in reciprocating engines, are found to have a beneficial effect on engine cleanliness and in the reduction of combustion chamber deposits.

Example XVIII

A commercial hydrocarbon fuel is blended according to the procedure of Example XVI containing 0.53 gram of lead per gallon as tetraethyllead, 0.5 theory of bromine as ethylene dibromide and 1.0 theory of chloride ethylene dichloride, the theories of halogen being based on the amount of lead present, and 6.0 grams of manganese per gallon in the form of benzene methylcyclopentadienyl manganese. The manganese in the form of aromatic cyclopentadienyl manganese compounds in this fuel is found to enhance its antiknock value considerably as indicated upon testing in a single-cylinder test engine.

As stated hereinabove, the amount of manganese that can be employed in the form of aromatic cyclopentadienyl manganese compounds of this invention in hydrocarbon fuels of the gasoline boiling range can vary from about 0.015 to about 10 grams of manganese per gallon, preferably 0.03 to 6 grams of manganese per gallon. In addition, the fuel can also contain organolead antiknock compounds, such as tetraethyllead, in amounts equivalent to from about 0.02 to about 13.2 grams of lead per gallon.

The new antiknock agents of this invention may be mixed with antioxidants, such as alkylated phenols and amines, metal de-activators, phosphorus compounds, and other antiknock agents, such as amines and alkyllead compounds, anti-rust and anti-icing agents, and wear inhibitors, may also be added to the antiknock composition or fuel containing the same.

In like manner, the fuels to which the antiknock compositions of this invention are added may have a wide variation of compositions. These fuels generally are petroleum hydrocarbon mixtures suitable for use in a spark ignition internal combustion engine. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be a straight run or processed hydrocarbons, including thermally cracked, catalytically cracked, reformed fractions, etc. When used for sparkfired engines, the boiling range of the components of gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is a little more restricted in the case of aviation gasoline. Specifications for the latter often call for a boiling range of from about 82° F. to about 338° F., with certain fractions of the fuel boiling away at particular intermediate temperatures.

The hydrocarbon fuels in which the antiknock agent of this invention can be employed often contain minor quantities of various impurities. One such impurity is sulfur, which can be present either in a combined form as an organic or inorganic compound, or as the elemental sulfur. The amounts of such sulfur can vary in various fuels from about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

A particular advantage of the new compositions of matter of the present invention is the fact that by proper selection of the individual groups comprising such compositions, compounds having "tailormade" characteristics can be obtained. Thus, by the proper selection of the cyclopentadienyl and aromatic groups, it is possible to prepare compounds possessing differing degrees of stability, volatility and solubility. Likewise, the selection of these constituents also enables the preparation of compounds of diverse applicability.

The aromatic cyclopentadienyl manganese compounds of this invention may be incorporated in paints, varnish, printing inks, synthetic resins of the drying oil type, oil enamels and the like, to impart excellent drying characteristics to such compositions. Generally speaking, from 0.01 to 0.05 percent of manganese as a compound of this invention is beneficially employed as a dryer in such a composition.

For example, to a typical varnish composition containing 100 parts ester gum, 173 parts of tung oil, 23 parts of linseed oil and 275 parts of white petroleum naphtha is added 3.0 parts of toluene cyclopentadienyl manganese. The resulting varnish composition is found to have excellent drying characteristics. Especially good results are obtained when other drying oil compositions and other aromatic cyclopentadienyl manganese compounds of this invention are employed.

Other important uses of the aromatic cyclopentadienyl compounds of the present invention include the use thereof as metal plating agents and chemical intermediates, particularly in the preparation of metal and metalloid containing polymeric materials. In addition, some of the cyclomatic derivatives of this invention can be used in the manufacture of medicinals and other therapeutic materials, as well as agricultural chemicals such as, for example, fungicides, defoliants, growth regulants, and so on.

Having fully described the novel cyclomatic derivatives of the present invention, the need therefor, and the best methods devised for their preparation, we do not intend that our invention be limited except within the spirit and scope of the appended claims.

We claim:

1. A compound having an aromatic hydrocarbon molecule composed of six to 18 carbon atoms, said hydrocarbon being selected from the group consisting of benzene, biphenyl, naphthalene, hydrocarbon substituted benzenes, hydrocarbon substituted biphenyls and hydrocarbon substituted naphthalenes, said hydrocarbon being coordinated to a single Group VIIB metal atom, the compound being stabilized by additional coordination with a cyclopentadienyl radical selected from the class consisting of the cyclopentadienyl radical and hydrocarbon substituted cyclopentadienyl radicals having from 6 to 13 carbon atoms which embody a ring having the general configuration found in cyclopentadiene, wherein the carbon atoms comprising a benzene ring within the aromatic hydrocarbon contribute six electrons to the metal atom, and the carbon atoms comprising a cyclopentadiene ring within the cyclopentadienyl radical contribute five electrons to the metal atom, thereby giving the metal the electron configuration of the next higher rare gas.

2. Process for the preparation of an aromatic Group VIIB metal cyclopentadienyl compound, said process comprising reacting
 (a) a cyclopentadienyl Group VIIB metal compound whose cyclopentadienyl radical is selected from the class consisting of the cyclopentadienyl radical and hydrocarbon substituted cyclopentadienyl radicals having from 6 to about 13 carbon atoms, which embody a ring of 5 carbon atoms having the general configuration found in cyclopentadiene and whose metal atom's electronic configuration has less electrons than the next higher rare gas of the Periodic Table,
 (b) an aromatic metal compound of a metal of Groups I to III of the Periodic Table whose aromatic constituent is bonded through a single carbon atom directly to the metal atom, said aromatic constituent containing 6 to 18 carbon atoms and being selected from the class consisting of benzene, biphenyl, naphthalene, hydrocarbon substituted benzenes, hydrocarbon substituted biphenyls, and hydrocarbon substituted naphthalenes;

said reaction being conducted at a temperature between about —50° C. and 200° C., to form an intermediate reaction product, and thereafter reacting said intermediate reaction product with a compound having active hydrogen.

3. The compound of claim 1 wherein said Group VIIB metal is manganese.

4. The compound of claim 1 wherein said cyclopentadienyl radical is a methylcyclopentadienyl group.

5. The compound of claim 1 wherein said aromatic hydrocarbon is toluene.

6. The compound of claim 1 wherein said aromatic hydrocarbon is biphenyl.

7. Process for the preparation of benzene methylcyclopentadienyl manganese, said said process comprising reacting methylcyclopentadienyl manganese chloride with phenyl magnesium bromide and thereafter reacting the intermediate thus formed with hydrochloric acid.

8. Benzene methylcyclopentadienyl manganese.

9. The process of claim 2 being carried out in the presence of an ether solvent.

10. The process of claim 9 wherein said ether solvent is tetrahydrofuran.

11. The process of claim 2 wherein an excess of said aromatic metal compound of a metal of Groups I to III is employed.

12. The process of claim 7 being carried out in the presence of tetrahydrofuran.

References Cited by the Examiner

UNITED STATES PATENTS 3,007,953   11/1961   Closson et al. _____ 260—429

OTHER REFERENCES

Coffield et al.: J.A.C.S., 79, 5826 (November 1957).
Fischer: "Angew. Chem.," 69, 715 (Nov. 21, 1957).

TOBIAS E. LEVOW, *Primary Examiner.*